US006611937B1

United States Patent
Kadyk et al.

(10) Patent No.: US 6,611,937 B1
(45) Date of Patent: *Aug. 26, 2003

(54) ERROR CORRECTION ON A MOBILE DEVICE

(75) Inventors: Don Kadyk, Bothell, WA (US); Vinay Deo, Bellevue, WA (US); Michael J. O'Leary, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/692,121

(22) Filed: Oct. 19, 2000

Related U.S. Application Data

(62) Division of application No. 09/188,755, filed on Nov. 9, 1998, now Pat. No. 6,209,111.

(51) Int. Cl.$^7$ ................................ G06F 11/00
(52) U.S. Cl. ....................................... 714/747
(58) Field of Search ............... 345/302; 709/219; 455/466, 442, 38.1; 714/747

(56) References Cited

U.S. PATENT DOCUMENTS

| 4,471,345 A | 9/1984 | Barrett, Jr. ............... 340/572 |
|---|---|---|
| 4,759,022 A | 7/1988 | Akerberg .................. 371/69 |
| 5,426,653 A | 6/1995 | Hayes et al. ............... 371/36 |
| 5,463,646 A | 10/1995 | Dillon et al. ............. 371/69.1 |
| 5,721,743 A | 2/1998 | Sharpe et al. ............ 371/37.7 |
| 5,822,527 A | 10/1998 | Post ...................... 395/200.36 |
| 5,945,986 A * | 8/1999 | Bargar et al. .............. 345/302 |
| 5,987,432 A | 11/1999 | Zusman et al. ............. 705/35 |
| 6,006,258 A * | 12/1999 | Kalajan ................... 709/219 |
| 6,067,444 A * | 5/2000 | Cannon et al. ............ 455/38.1 |
| 6,216,004 B1 * | 4/2001 | Tiedemann, Jr. et al. ... 455/442 |

FOREIGN PATENT DOCUMENTS

FR 2 655 498 A1 12/1989

OTHER PUBLICATIONS

PCT/US 99/26393—PCT Notification of Transmittal of the International Search Report or the Declaration. Dated Apr. 25, 2000.

* cited by examiner

*Primary Examiner*—David Ton
(74) *Attorney, Agent, or Firm*—Joseph R. Kelly; Westman, Champlin & Kelly, P.A.

(57) ABSTRACT

First and second instances of a message are received over a wireless connection. It is determined whether the first and second instances of the message contain an error. If both instances contain an error, an error free instance of the message is reconstructed from the two erroneous instances by merging portions of the first and second instances.

9 Claims, 13 Drawing Sheets

ERROR CORRECTION ON A MOBILE DEVICE

This is a division of application Ser. No. 09/188,755, filed Nov. 9, 1998, now U.S. Pat. No. 6,209,111.

BACKGROUND OF THE INVENTION

The present invention relates to personal mobile computing devices commonly known as mobile devices. More particularly, the present invention relates to a system and method for transmitting to, receiving and correcting information on mobile devices.

Mobile devices are small electronic computing devices often referred to as personal digital assistants. Many such mobile devices are pagers, hand held devices, or palm size devices, which comfortably fit within the hand. One commercially available device is sold under the tradename HANDHELD PC (or H/PC), another is sold under the tradename PALM PC (or P/PC), both having software provided by Microsoft Corporation of Redmond, Wash.

Generally, the mobile device includes a processor, random access memory (RAM), and an input device such as a keyboard, touchpad or input buttons and a display. The keyboard can be integrated with the display, such as when the keyboard is incorporated as a touch sensitive display. A communication interface is optionally provided and is commonly used to communicate with the desktop computer. A replaceable or rechargeable battery powers the mobile device. Optionally, the mobile device can receive power from an external power source that overrides or recharges the built-in battery.

In some prior applications, the mobile device is used in conjunction with the desktop computer. For example, the user of the mobile device may also have access to, and use, a desktop computer at work or at home or both. If the mobile device is an H/PC brand device or other similar device, the user typically runs the same types of applications on both the desktop computer and on the mobile device. Thus, it is quite advantageous for such mobile devices to be designed to be coupled to the desktop computer to exchange information with, and share information with, the desktop computer.

Another technique for providing information to mobile devices is through a wireless transmission link. Such information can include electronic mail or news, weather, sports, traffic and local event information. The information may be obtained from a desktop computer connected to the Internet and delivered over a wired connection. However, it may be desirable to deliver such information over a wireless connection as well. A wireless receiver on the mobile device can act to receive information as it is being sent to the mobile device.

Where the mobile device is a pager, each pager in a given system has one or more addresses. When a message is transmitted over a wireless channel, it is destined for an address. All pagers assigned to that wireless channel receive the message and check the address contained in the message against its own addresses. This address-matching algorithm can be implemented either in the hardware, or in software, or in a combination of hardware and software. If the address associated with the incoming message does not match any of the addresses on the pager, then the message is discarded. However, if the address does match one of the addresses on the pager, then the message can be accepted and forwarded to higher level software or hardware in the protocol stack on the pager for suitable processing.

When the mobile device is a pager, or when it includes a pager, it suffers from a number of disadvantages. For example, paging networks are conventionally one-way networks in which a message is transmitted, or broadcast, to one or more pagers in an open loop environment. In that case, it is difficult, if not impossible, to determine whether the target device (or the target group of devices) has received the message. It is also difficult, if not impossible, to determine whether the target device has received an error free message.

One-way paging networks are prone to burst errors that cause some of the messages to be in error. In some cases, the paging industry has deemed this acceptable, since the user can sometimes determine the correct message content, even if the message contains errors, simply from the context of the message. However, in some cases this is highly undesirable. For example, when the message contains a phone number or important stock price information, this information can be lost in a burst error. This becomes unacceptable to the user.

For many years, the paging industry has worked to solve this problem. The industry has made incremental improvements in the over-the-air paging protocol used to transmit the messages. The Motorola FLEX paging system and the POCSAG paging system have improved messaging quality, but still see errors in messages.

Another method which has been implemented in an attempt to ensure that a message is transmitted to its destination error free is to send the message twice. In fact, some paging environments are so prone to burst errors that every message is sent twice on the paging system, as a standard operating procedure. Conventional pagers have the ability to hide the fact that a page is sent twice as long as the text of the two pages are exactly the same. Therefore, if both instances of the message are received error free, one instance of the message is simply discarded or hidden and the user only sees one error free instance of the message. However, if one or both of the instances have errors, they are both displayed to the user allowing the user to, in his or her mind, piece together portions of both instances of the message to determine the content of the correct, error free message.

This can also be a highly undesirable method. Such a method is inconvenient and cumbersome in that it requires more work on the part of the user to determine the correct content of the message. Further, some messages are not necessarily readable by average users and require some amount of data processing before the data is displayed to the user. In that case, simply sending two instances of the same message where both instances contain errors, does not remedy the one-way paging reliability problem.

SUMMARY OF THE INVENTION

First and second instances of a message are received over a wireless connection. It is determined whether the first and second instances of the message contain an error. If both instances contain an error, an error free instance of the message is reconstructed from the two erroneous instances by merging portions of the first and second instances.

DETAILED DESCRIPTION OF THE ILLUSTRATIVE EMBODIMENTS

Figure 1:
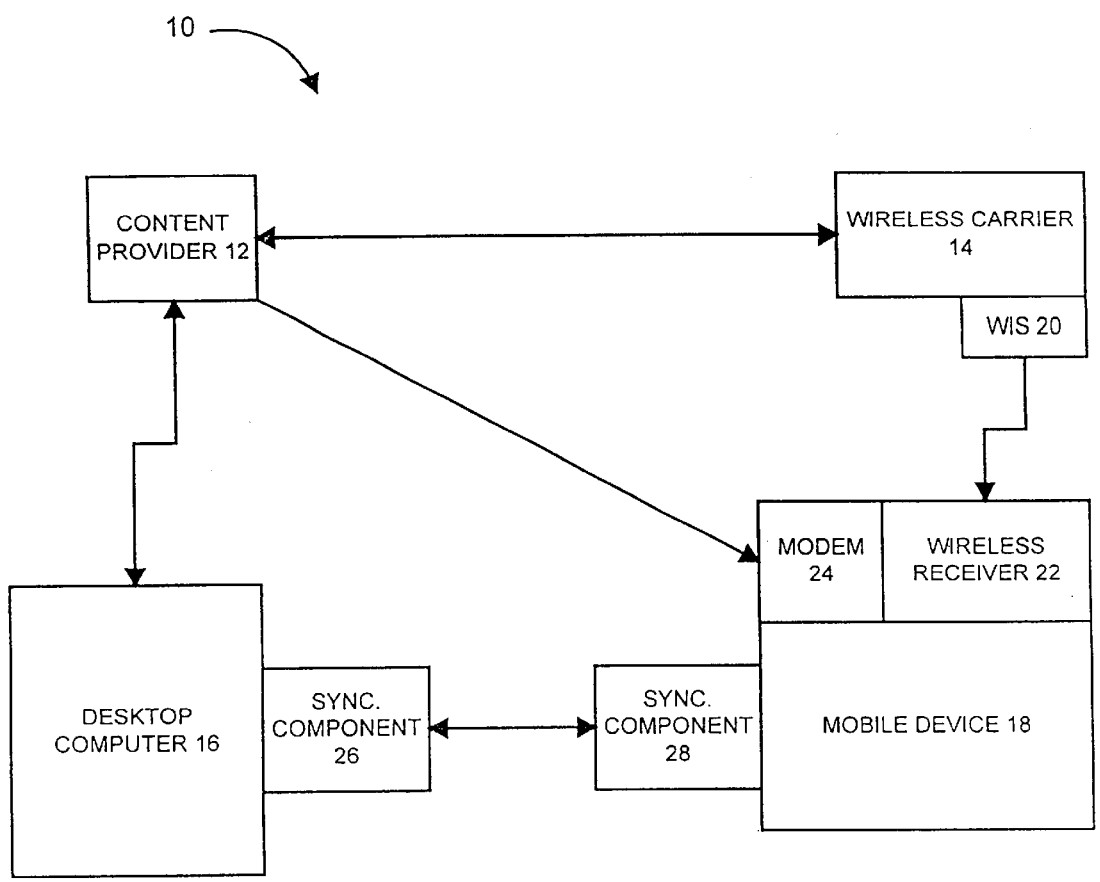
FIG. 1 is a simplified block diagram illustrating one embodiment of a mobile device in a system in accordance with one aspect of the present invention.

FIG. 1 illustrates a system 10 in which the present invention can be implemented. System 10 includes content provider 12, wireless carrier 14, desktop computer 16 and mobile device 18. Content provider 12 provides any suitable type of data from a database or other data source. For example, content provider 12 is discussed hereinafter as a provider of wireless services or other types of services which may be desired by a user of mobile device 18. Examples of such services include news, weather and sports services, stock quote services, traffic report services, etc.

Wireless carrier 14 is described in greater detail later in the application. Briefly, however, wireless carrier 14 is configured to receive service content and programming messages (hereinafter content) from content provider 12 via dial-up or direct internet connection, or a network connection. The way in which wireless carrier 14 obtains information from content provider 12 can include proprietary or non-proprietary means. For example, in one illustrative embodiment, wireless carrier 14 subscribes to active channels at a content provider's web site using the INTERNET EXPLORER brand product available from Microsoft Corporation. The INTERNET EXPLORER brand component pulls data from the web site and stores it in a cache for later transmission to mobile device 18.

Wireless carrier 14 also includes a wireless information server (WIS) 20. Server 20 splits the content received from content provider 12 into pieces which are compatible with the particular type of transport being used by wireless carrier 14. For instance, server 20 may split the data such that it conforms to maximum packet size constraints, character set requirements, etc. for the channel type or transport type being used. Prior to transmission, the data is preferably translated to a different form. As is described in greater detail later in the application, such translation may include various forms of encryption, and may also include compression, encoding, etc. Once the data has been split appropriately such that it conforms to the transport constraints, the data is then configured for transmission over the air through a wireless network (such as through a paging channel) to be received directly on mobile device 18. The transmitted data is received by a wireless receiver and driver component 22 on mobile device 18 where the data is prepared for use by mobile device 18.

Mobile device 18 may also include a modem 24. Thus, rather than being transmitted through wireless carrier 14, the service content can be transmitted directly from content provider 12 through a direct dial-up modem connection to mobile device 18.

Desktop computer 16 will also be described in greater detail later in the specification. Briefly, however, desktop computer 16 is preferably provided with a standard web browser, such as the INTERNET EXPLORER 4.0 brand component, commercially available from the Microsoft Corporation of Redmond, Wash. That being the case, the users of desktop computer 16 can preferably subscribe to channels in a standard fashion which provide the user with certain channel content which can be browsed off-line or on-line. Desktop computer 16 can thus periodically retrieve or receive new content for further transmission to mobile device 18.

Desktop computer 16 also illustratively includes synchronization component 26. Briefly, synchronization component 26 is configured to interact with an optional, similar synchronization component 28 on mobile device 18 such that files which are the subject of synchronization can be synchronized from desktop computer 16 to mobile device 18, or vice versa. Once synchronized, both files (those on computer 16 and mobile device 18) contain up to date information.

More specifically, mobile device 18, in the preferred embodiment, can be synchronized with either desktop computer 16, or another mobile device 18, or both. In that instance, properties of objects stored in an object store on mobile device 18 are similar to properties of other instances of the same object stored in an object store on desktop computer 16 or another mobile device 18. Thus, for example, when a user changes one instance of an object stored in an object store on desktop computer 16, the second instance of that object in the object store of mobile device 18 is updated the next time mobile device 18 is connected to desktop computer 16 so that both instances of the same object contain up-to-date data. This is referred to as synchronization.

In order to accomplish synchronization, synchronization components 26 and 28 run on both mobile device 18 and desktop computer 16 (or another mobile device 18). The synchronization components communicate with one another through well defined interfaces to manage communication and synchronization.

In one illustrative embodiment, mobile device 18 communicates with desktop computer 16 with a physical cable which communicates using a serial communications protocol. Other communication mechanisms are also contemplated by the present invention, such as infrared (IR) communication or other suitable communication mechanisms.

Figure 2:
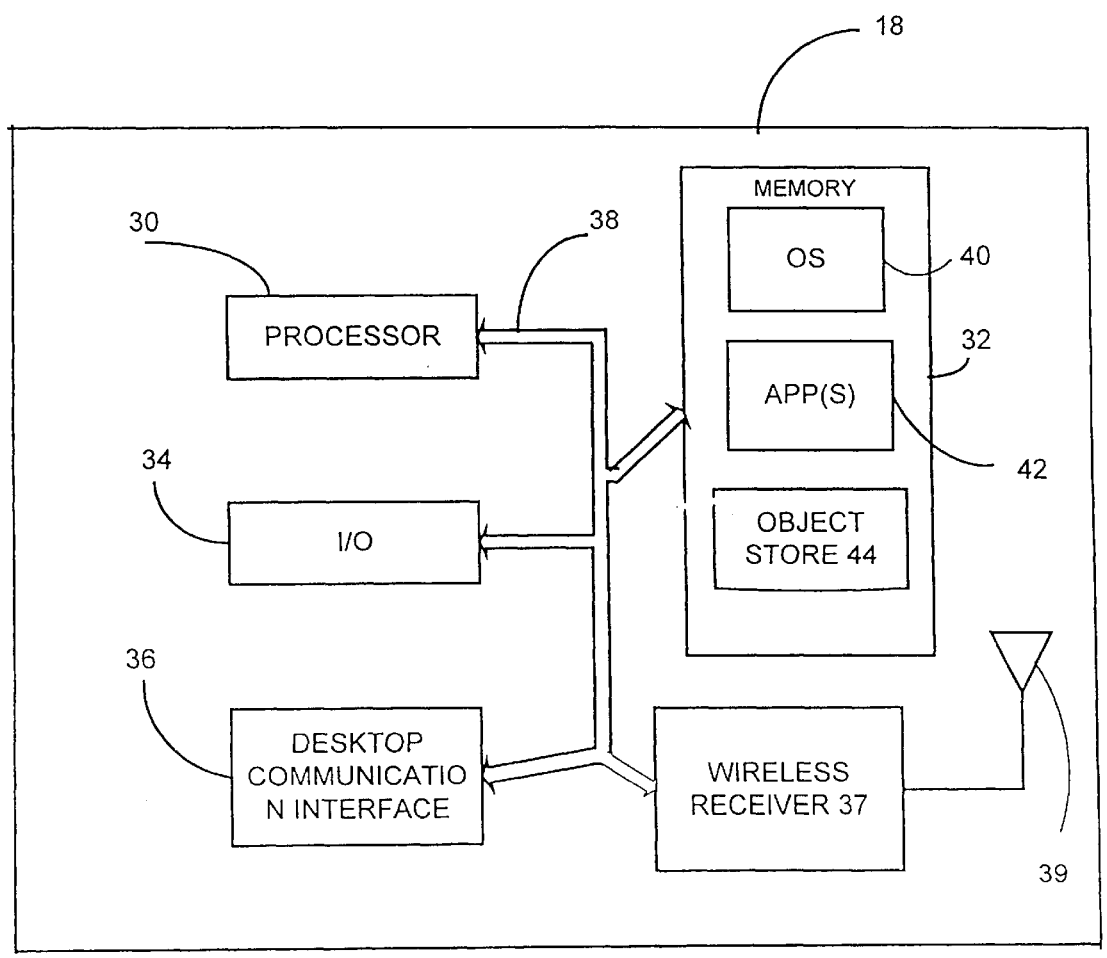
FIG. 2 is a more detailed block diagram of one embodiment of a mobile device shown in FIG. 1.

FIG. 2 is a more detailed block diagram of mobile device 18. Mobile device 18 illustratively includes microprocessor 30, memory 32, input/output (I/O) components 34, desktop communication interface 36 wireless receiver 37 and antenna 39. These components of mobile device 18 can be coupled for communication with one another over a suitable bus 38.

Memory 32 is preferably implemented as nonvolatile electronic memory such as random access memory (RAM) with a battery back-up module (not shown) such that information stored in memory 32 is not lost when the general power to mobile device 18 is shut down. A portion of memory 32 is illustratively allocated as addressable memory for program execution, while another portion of memory 32 is optionally used for storage, such as to simulate storage on a discdrive.

Memory 32 can include operating system 40, an application program 42 (such as a personal information manager or PIM, an electronic mail program, etc.), as well as an object store 44. During operation, operating system 40 is illustratively executed by processor 30 from memory 32. Operating system 40, in one embodiment, is a WINDOWS CE brand operating system commercially available from Microsoft Corporation. The operating system 40 is designed for mobile devices, and implements database features which can be utilized by PIM 42 through a set of exposed application programming interfaces and methods. The objects in object store 44 are illustratively maintained by PIM 42 and operating system 40, at least partially in response to calls to the exposed application programming interfaces and methods.

I/O components 34, in one embodiment, are provided to facilitate input and output operations from a user of mobile device 18. I/O components 34 are described in greater detail with respect to FIGS. 3 and 4.

Desktop communication interface 36 is optionally provided as any suitable communication interface. Interface 36 is illustratively used to communicate with desktop computer 16, content provider 12, and wireless carrier 14, as described with respect to FIG. 1. Thus, communication interface 36 may include synchronization component 28 for communicating with desktop computer 16 and modem 24 for communicating with content provider 12. Wireless receiver and driver 22 are used for communicating with wireless carrier 14.

Figure 3:
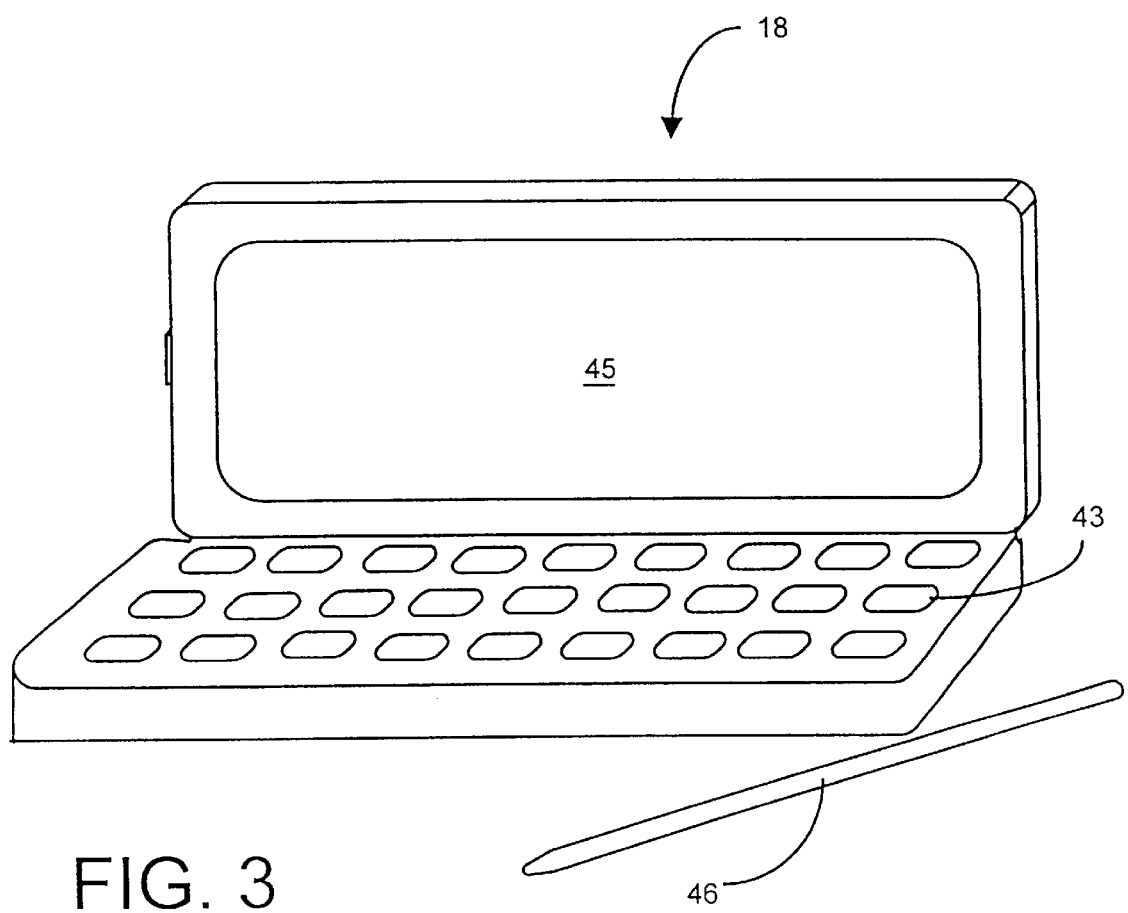
FIG. 3 is a simplified pictorial illustration of one embodiment of the mobile device shown in FIG. 2.

FIG. 3 is a simplified pictorial illustration of one preferred embodiment of a mobile device 18 which can be used in accordance with the present invention. Mobile device 18, as illustrated in FIG. 3, can be a desktop assistant sold under the designation H/PC having software provided by the Microsoft Corporation. In one embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is illustratively implemented as a miniaturized alpha-numeric keyboard, with any suitable and desired function keys which are also provided for accomplishing certain user input functions.

Figure 4:
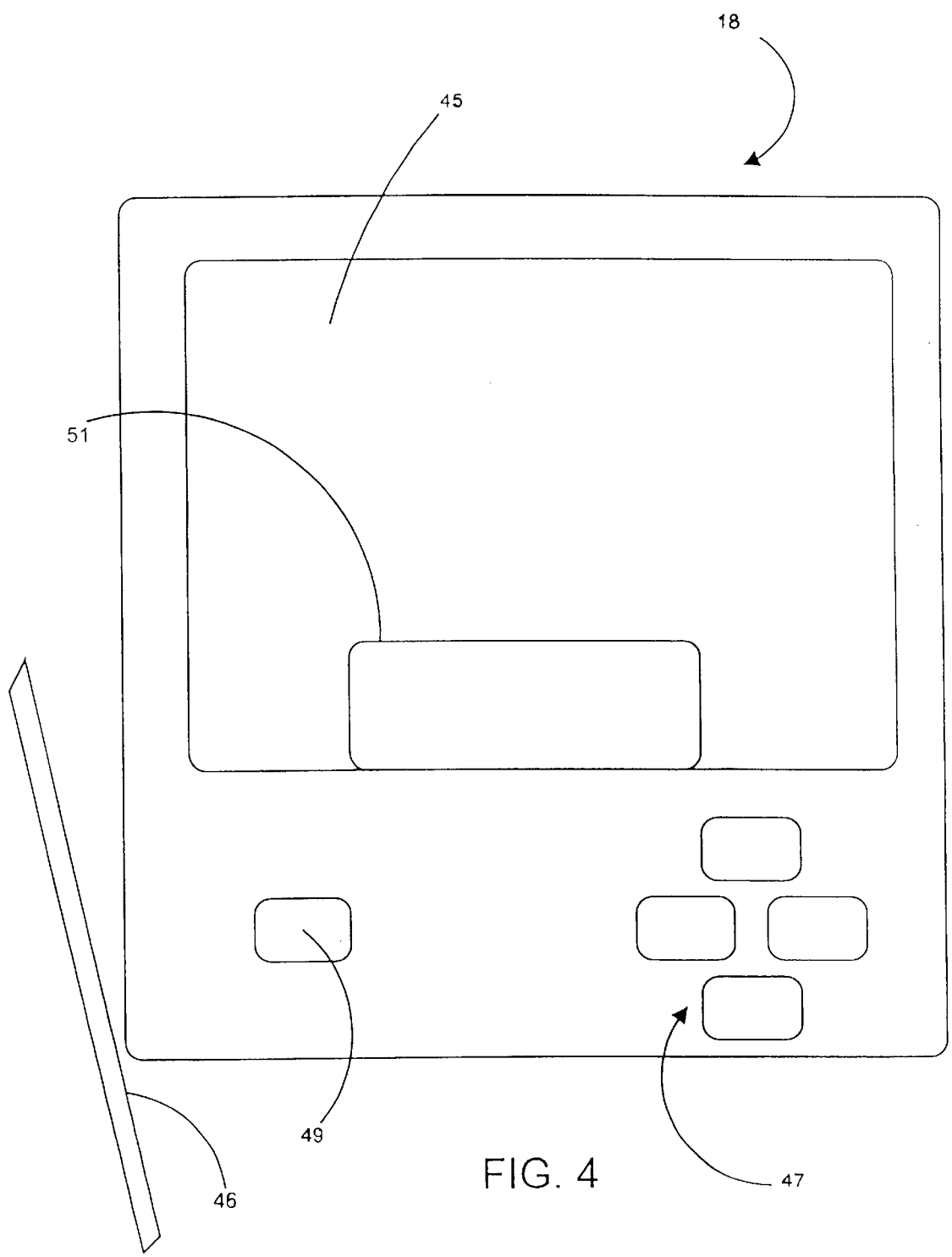
FIG. 4 is a simplified pictorial illustration of another embodiment of the mobile device shown in FIG. 2.

FIG. 4 is another simplified pictorial illustration of the mobile device 18 in accordance with another embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions. When mobile device 18 is implemented as a pager, screen 45 is not illustratively touch sensitive and stylus 46 is not needed.

It should be noted that the display 45 for the mobile device as shown in FIGS. 3 and 4 can be the same size as one another, or different sizes from one another, but would typically be much smaller than a conventional display used with a desktop computer. For example, displays 45 shown in FIGS. 3 and 4 may be defined by a matrix of only 240×320 coordinates, or 160×160 coordinates, or any other suitable size. When mobile device 18 is a pager, display 45 may be even smaller The mobile device 18 shown in FIG. 4 also includes a number of user input keys or buttons (such as scroll buttons 47) which allow the user to scroll through menu options or other display options which are displayed on display 45, or which allow the user to change applications or select user input functions, without contacting display 45. In addition, the mobile device 18 shown in FIG. 4 also illustratively includes a power button 49 which can be used to turn on and off the general power to the mobile device 18.

It should also be noted that, in the embodiment illustrated in FIG. 4, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on the display screen 45 such that the user can review the hand written messages entered into the mobile device 18. In another embodiment, mobile device 18 is provided with a character recognition module such that the user can enter alpha-numeric information into mobile device 18 by writing that alpha-numeric information on area 51 with stylus 46. In that instance, a character recognition module in the mobile device 18 recognizes the alpha-numeric characters and converts the characters into computer recognizable alpha-numeric characters which can be used by the application programs 42 in mobile device 18.

Of course, where mobile device 18 is implemented as a pager, stylus 46 and handwriting area 51 are not needed. Instead, mobile device 18 can be simply provided with screen 45, user input buttons 47, power button 49, and a compact physical housing or case.

Figure 5:
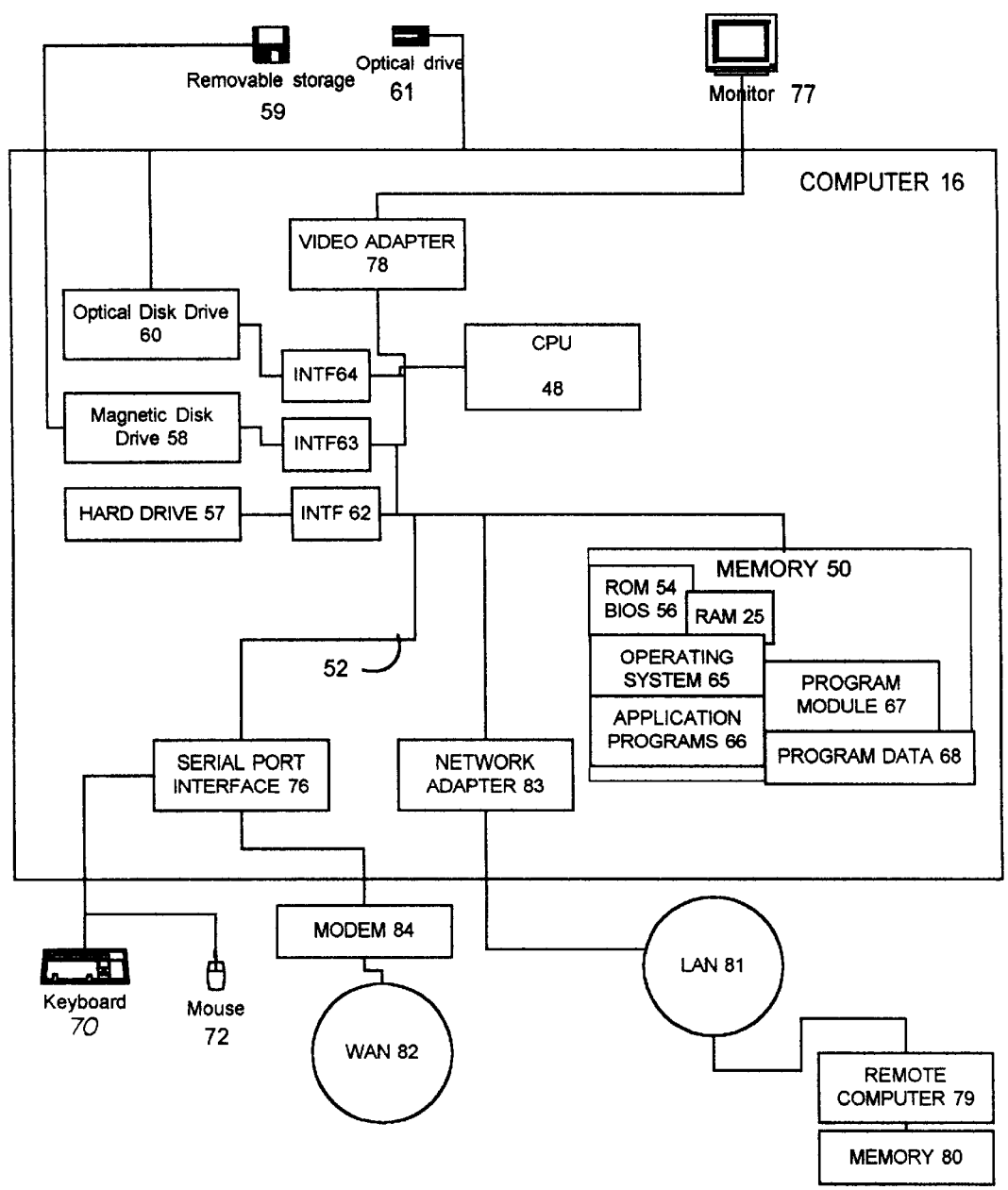
FIG. 5 is a block diagram of one embodiment of a desktop computer in accordance with one aspect of the present invention.

FIG. 5 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide nonvolatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68. A user may enter commands and information into the desktop computer 16 through input devices such as a keyboard 70, pointing device 72. and microphone 74. Other input devices (not shown) may include a joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker 75 and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 4. The logic connections depicted in FIG. 4 include a local area network (LAN) 81 and a wide area network (WAN) 82. Such networking environments are commonplace in offices, enterprisewide computer network intranets and the Internet.

When used in a LAN networking environment, the desktop computer 16 is connected to the local area network 81 through a network interface or adapter 83. When used in a WAN networking environment, the desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, including synchronization component 26, may be stored in local or remote memory storage devices. It will be appreciated that the network connections shown are exemplary and other means of establishing a communications link between the computers may be used.

Desktop computer 16 runs operating system 65 that is typically stored in non-volatile memory 54 and executes on the processor 48. One suitable operating system is a Windows brand operating system sold by Microsoft Corporation, such as WINDOWS 95 or WINDOWS NT brand, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. Application programs are preferably stored in program module 67, in volatile memory or non-volatile memory, or can be loaded into any of the components shown in FIG. 5 from a floppy diskette 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with the particular PIM or other program is designed specifically to work in conjunction with that PIM and to expose desktop synchronization interfaces. The DLL, in turn, calls interfaces exposed by the PIM in order to access data representing individual properties of objects maintained in an object store. The object store, of course, can reside in any one of the suitable memory components described with respect to FIG. 4.

Figure 6:
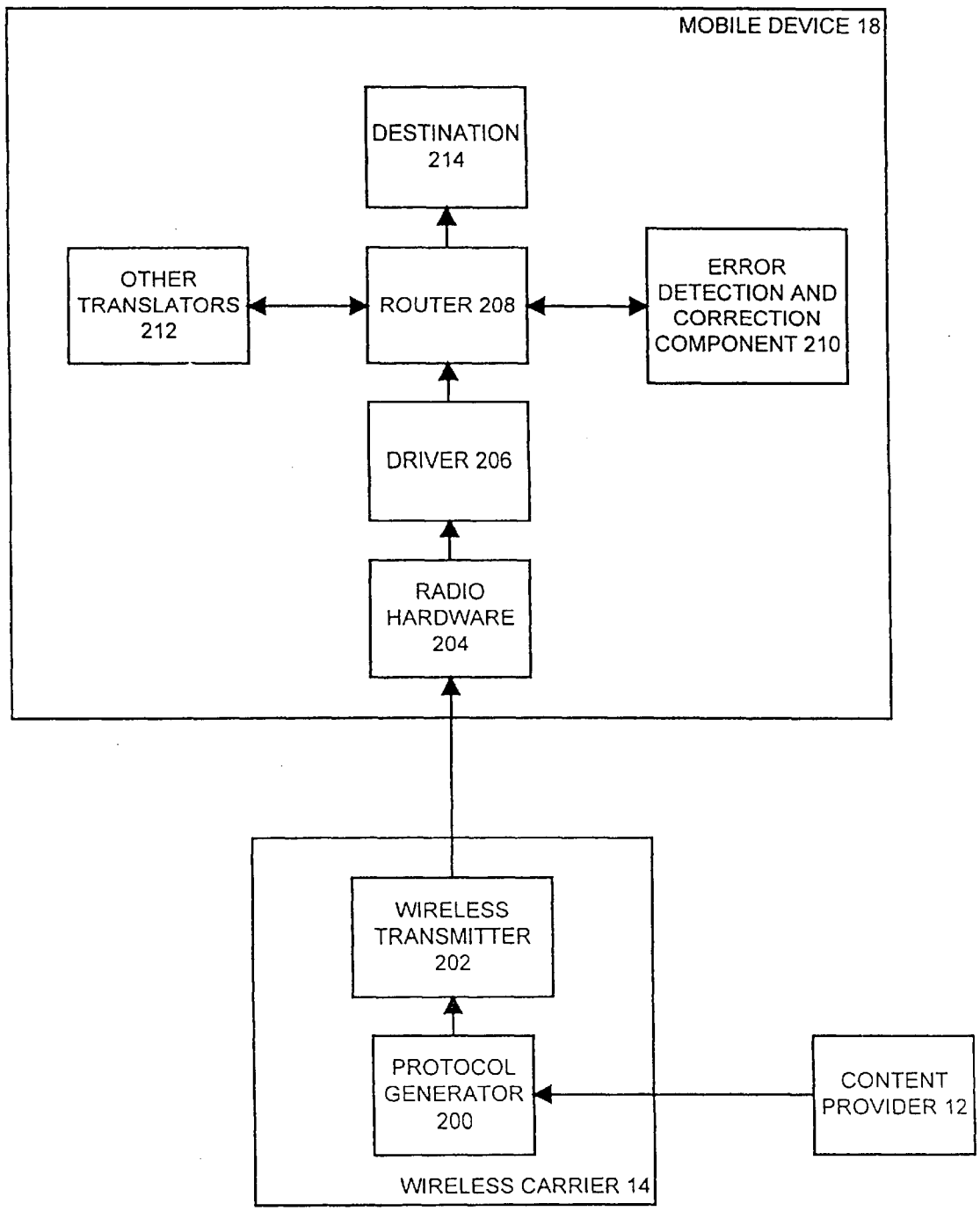
FIG. 6 is a more detailed block diagram of a transmission system including a mobile device in accordance with one aspect of the present invention.

FIG. 6 is a more detailed blocked diagram of certain components of the system shown in FIG. 1. FIG. 6 illustrates content provider 12, and also illustrates wireless carrier 14 and mobile device 18 in greater detail. FIG. 6 shows that wireless carrier 14 includes protocol generator 200 and wireless transmitter 202. In addition, FIG. 6 illustrates that mobile device 18 includes radio hardware 204, driver components 206, router 208, error detection and correction component (or reconstruction component) 210, other translators 212, and destination component 214.

Content provider 12 provides content to the protocol generator 200 in wireless carrier 14. Protocol generator 200 manipulates the content to place it in a desired form according to the transmission protocol implemented by the system. Protocol generation 200 also illustratively translates the content for better transmission by wireless carrier 14. Such translations can include encoding, encryption, compression, etc. The content is illustratively broken into protocol packets which are provided to wireless transmitter for transmission to radio hardware 204 in mobile device 18. One illustrative data structure for transmitted messages is described in greater detail with respect to FIG. 7 below. In the embodiment illustrated in FIG. 6, the transmission link between wireless carrier 14 and mobile device 18 is a wireless transmission link, such as a paging channel.

Radio hardware 204 receives the packets and performs low level filtering to determine whether the messages transmitted by wireless carrier 14 are intended for that specific mobile device 18. In one illustrative embodiment, additional high level filtering can also be provided to further filter the messages based upon header and protocol information transmitted along with the messages from wireless carrier 14. Radio hardware 204 can, for example, be implemented as a removable hardware item, such as a radio PCMCIA type card.

Driver 206 is preferably formed to implement a suitable protocol in receiving messages from radio hardware 204 and passing them to higher level components for processing. Router 208, in one illustrative embodiment, is typically implanted as an application program that is configured to use a number of inputs/output (I/O) control calls to perform various operations. Driver 206 supports and implements the I/O control calls according to a predefined syntax and operation.

Router 208 passes the received messages to error detection and correction component 210. Error detection and correction component 210 is described in greater detail below, and determines whether a message contains any errors. Component 210 also attempts to correct errors by merging two instances of the same message to obtain an error free message. The resulting message is handed back to router 208 which, in turn, optionally passes the message to other translators 212 for additional processing. Translators 212 illustratively include complementary translators to those found in protocol generator 200 and wireless carrier 14. Such translators can include decoding translators, decryption translators, decompression translators, etc. Once the message has been translated, router 208 passes the message to its eventual destination 214. The destination can simply include a display module, or another application program such as an e-mail program, etc.

In all paging environments, there is a certain probability that any single piece of a message will be in error. For example, in some paging environments, the probability that any byte in a given page is in error is approximately 1%. However, this dramatically increases to 20–30% for the next byte in that page, after the first byte in error. However, the probability that the same piece of data in two identical pages (i.e., in two instances of the same page) sent back-to-back are in error is very low. This probability is on the border of 0.01%, under normal circumstances. The probability is higher, for example, if the receiver has gone out of the paging range, into a tunnel, or becomes otherwise unavailable. The present invention takes advantage of the significantly lower probability that two instances of a message will contain errors in the same data blocks.

Figure 7:
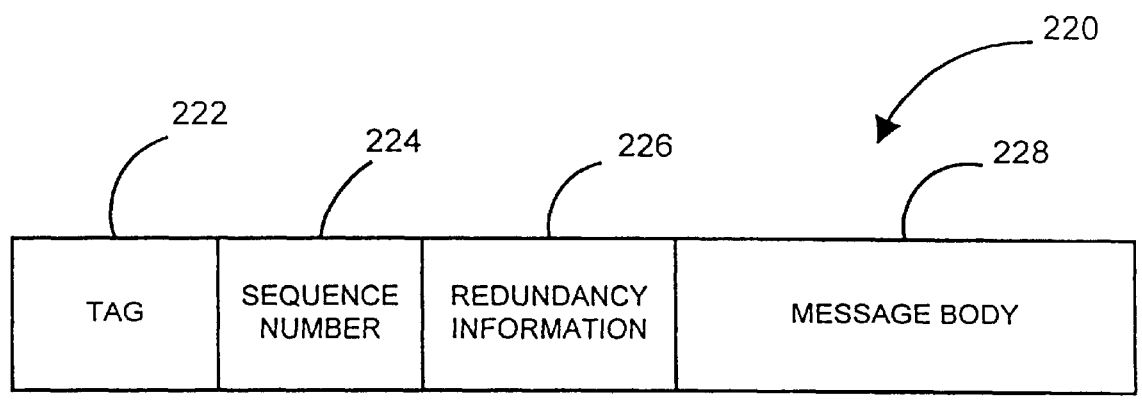
FIG. 7 is a data structure diagram illustrating a message wrapped with protocol in accordance with one aspect of the present invention.

FIG. 7 illustrates a data structure 220 which is used in sending messages in accordance with one aspect of the present invention. The protocol described with respect to FIG. 7 is illustratively placed on the message prior to the network layer protocol. In a paging system, this means that the layer is illustratively inserted between the application and network layers.

Data structure 220 includes one or more tags 222, a sequence number 224, error detection (or redundancy) information 226, and message body or payload information 228.

It should be noted that fields 222, 224 and 226 can either be placed at the beginning or at the end of the message body 228, can be split between the beginning and end of message 228, can be distributed over, intermixed with or contained within payload information 228, or can be arranged in any other suitable fashion.

Message body 228 is simply the original message which is to be transmitted to mobile device 18. Error checking information 226 can take a number of forms. For example, in conventional paging protocols, such information is provided as a way to determine if the particular message being sent has errors. In the POCSAG type system, the information is redundancy information which is simply used to determine whether the message contains any errors. In the FLEX paging system, information 226 is provided for implementing a more complex error detection algorithm. In that system, information 226 can be used not only to determine whether an error exists, but also to determine which bytes in the message are in error.

For both of these systems, and other conventional paging systems, the underlying protocol which already exists can be used to determine if the message has errors. In accordance with one embodiment of the present invention, information 226 in a POCSAG-type system is supplemented to include an extra checksum, cyclic redundancy code (CRC), or other information which can be used, once the message is corrected in accordance with the present invention, to determine that the corrected message is error free. In one illustrative embodiment, such supplemental information 226 includes a 7 bit checksum that is designed to produce checksum values in the range of 0X20 to 0X7E. In a FLEX-type system, no such supplemental information needs to be provided.

Message sequence number 224 is used to identify two corresponding instances of a message. Illustratively, sequence number 224 is a large enough number that, when the sequence rolls over, the message that used the number previously has cleared the error correction operation. This can illustratively be a sequence number provided by the existing paging protocol, or a number which is added to the message overhead. For example, the message sequence number 224 is a standard feature of the FLEX-type protocol. In a POCSAG-type system, the sequence number is added to the paging overhead, since there is no protocol level method to include this number in such a system. In one illustrative embodiment, the sequence number has values in a range of 0X20 to 0X7E, so that 94 sequence numbers are available. However, fewer values can be used. In another illustrative embodiment, only 64 values are used.

Tag information 222 is preferably simply a tag identifying the page as using the error correction system in accordance with the present invention. This can simply take the form of a free bit in the paging protocol or a bit or byte in the added message overhead. This information simply indicates that the wireless carrier 14 will be sending two instance of the same message. The tag 222 is not required. However, it does allow one implementation of the present invention to conserve resources. For example, resources which would otherwise be used in performing correction in accordance with the present invention, can be freed if it is known at the outset that two instances will not be sent. In an illustrative implementation, if no tag is present, it is assumed that all messages will have two instances sent.

Figure 8:
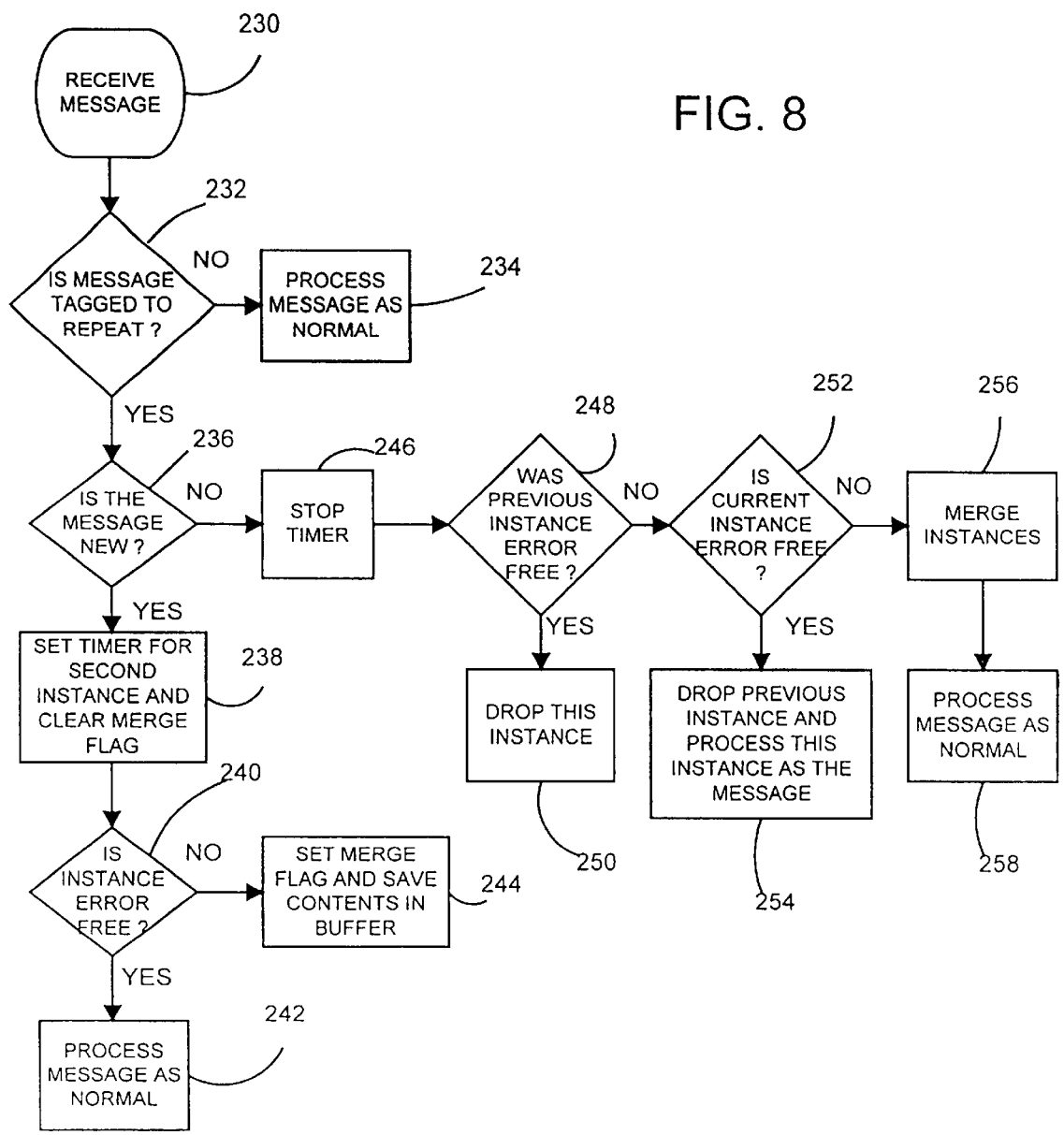
FIG. 8 is a flow diagram illustrating the operation of a mobile device in determining whether instances of a message are to be merged in accordance with one embodiment of the present invention.
Figure 9:
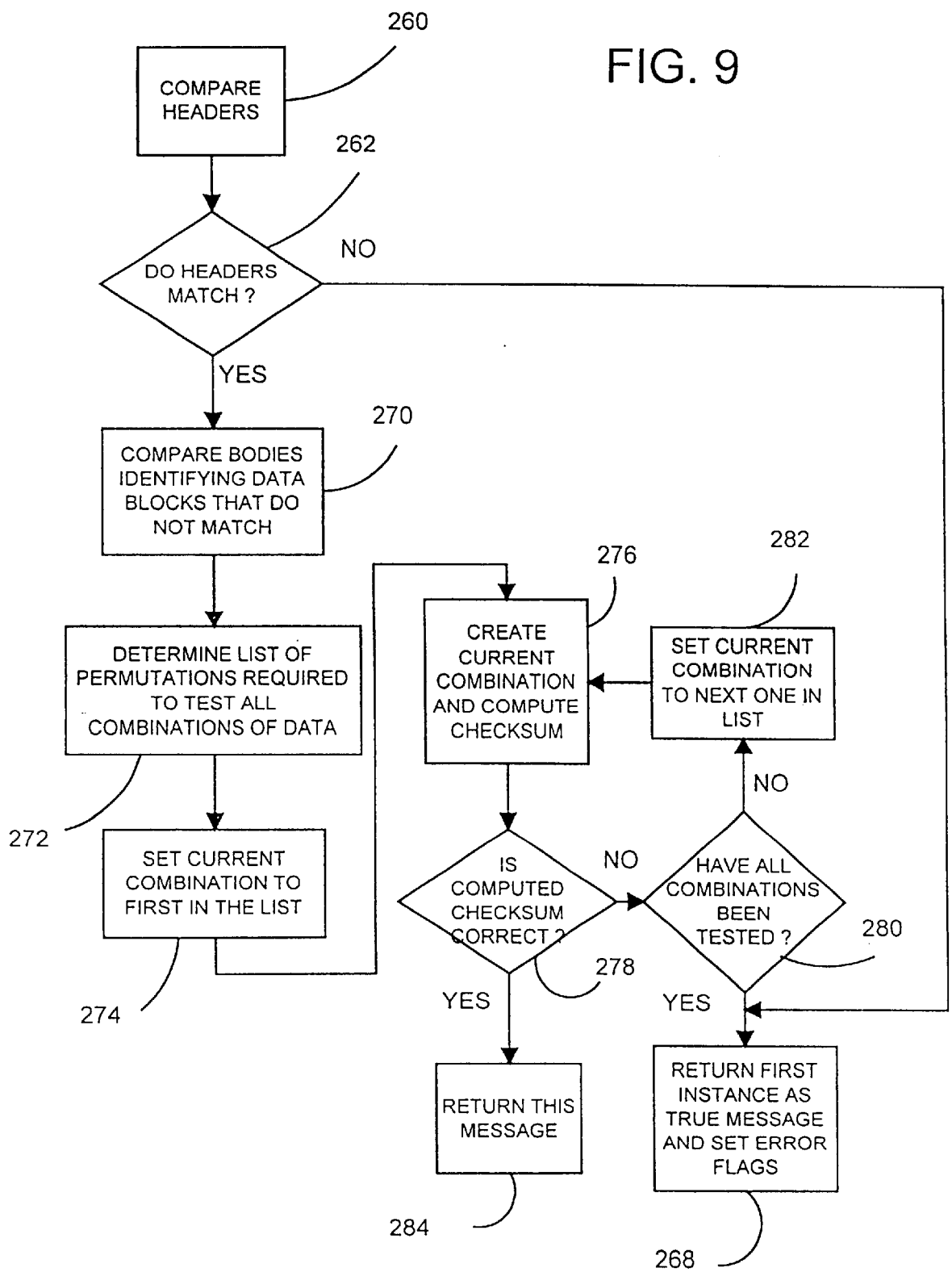
FIG. 9 is a flow diagram illustrating the operation of a mobile device in merging instances of a message in accordance with one embodiment of the present invention.

FIG. 8 is a flow diagram illustrating the operation of mobile device 18 once it receives the message described with respect to FIG. 7. Mobile device 18 first routes the message, such as through router 208, to error detection and correction component 210. Component 210 performs the operations discussed with respect to FIG. 8 and passes the message back to router 210 for further processing. Thus, the additional protocol wrapper described with respect to FIG. 7 is removed from the message before it is sent on to the application layer on mobile device 18 for further processing.

FIG. 8 shows that once a new message is received, as indicated by block 230, component 210 determines whether tag information 222 designates that two instances of the message will be sent. This is indicated at block 232. If not, component 210 simply passes the message back to router 208 for further processing, as indicated by block 234.

However, if the message is tagged to repeat, component 21b determines whether this is a new message (i.e., whether this is the first instance or the second instance of this message). This is indicated by block 236. If this is the first instance, component 210 sets a timer, and waits for the designated time out period to receive the second page. The time out period implemented in the timer may be dependent on the particular paging system being used, and is set to allow sufficient time for a second page to be received. In one exemplary embodiment, the time out period is approximately five minutes. Component 210 also clears all merge flags. This is indicated by block 238.

Component 210 then determines whether the first instance of the message is error free, as indicated by block 240. In performing this step, component 210 can simply implement a conventional POCSAG or FLEX-type error detection algorithm. If the first instance of the message is error free, that instance of the message is handed from component 210 back to router 208 for further processing. This is indicated by block 242. If, however, the first instance of this message does contain errors, then component 210 sets a merge flag indicating that the message will need to be merged with its second instance, when it arrives, and the first instance is saved in a message buffer. This is indicated by block 244. If the second instance of this message is not received within the time out period set by the timer, component 210 simply hands the erroneous message back to router 208, and sets error flags indicating that the message is in error.

When the second instance of the message is received, it is processed through blocks 230 and 232 as indicated above. However, at block 236, component 210 will determine that this is not a new message, because it has the same sequence number as the previous instance of that message. Thus, processing proceeds with respect to block 246. Component 210 then stops the timer which was set at block 238 and determines whether the first instance of the message was error free. This is indicated by block 248.

If the first instance of the message was error free, then block 210 simply drops the second instance of the message, since the first message has already been handed back for further processing. This is indicated by block 250.

However, if the first instance contained errors, component 210 then executes the error detection algorithm to determine whether the second instance, which has just received, is error free. This is indicated by block 252. If the second instance is error free, component 210 simply drops the first instance of the message from the buffer and passes the second instance of the message back to router 208 for further processing. This is indicated by block 254.

If, at block 252, component 210 determines that the second instance is also in error, then block 210 attempts to merge the two instances of the message to obtain an error free message. This is indicated by block 256. The merged message is then passed back from component 210 to router 208 for further processing. This is indicated by block 258. Once the message is passed back, the information associated with the message is dropped from the buffer and any timers associated with that message are also stopped.

The embodiment illustrated in FIG. 8 illustratively uses timers to free resources in mobile device 18 so that it can act on other received pages in a timely manner, when the second instance of a given message is not yet received..

FIGS. 9 and 10A–10G illustrate but one illustrative embodiment of a merging process in accordance with one aspect of the present invention. First, mobile device 18 receives two messages. Component 210 then determines that the two messages are actually two instances of the same message. Component 210 compares the sequence numbers in the message headers to determine this. This is indicated by blocks 260 and 262 in FIG. 9 and the messages are indicated by numerals 264 and 266 in FIG. 10A.

The messages are illustrated as including header information (I1 HEADER designates the header information for instance 1, and I2 HEADER designates the header information for instance 2). Messages 264 and 266 are also illustrated as having five data blocks in the message designated B1-1 to B5-1 for instance 1 and B1-2 to B5-2 for instance 2. The data blocks which contain asterisks are those data blocks which are in error, although component 210 does not yet know that these are the data blocks which contain the error.

If the sequence numbers in the header information do not match, and the timer has expired, then component 210 simply returns the first instance as the true message and sets appropriate error flags. This is indicated by block 268. However, if, at block 262, the sequence numbers do match, then component 210 compares corresponding data blocks in the two instances to determine which data blocks in one instance do not match corresponding data blocks in the other instance. In the embodiment shown in FIG. 10A, data blocks B1, B2, B4 and B5 are different from instance 1 (message 264) to instance 2 (message 266). Comparing of the data blocks is indicated by block 270 in FIG. 8.

Component 210 then determines a list of permutations which are required to test all combinations of data. In other words, component 210 determines the list of permutations which can be created by substituting non-matching data blocks from the second instance of the message 266 into corresponding data block positions in the first instance of the message 264. This is indicated by block 272 in FIG. 8. Component 210 then walks through the list of permutations, executing the redundancy algorithm with each permutation, until one of the permutations is determined to be error free.

In the embodiment illustrated in FIGS. 10A–10G, the permutation list is gray coded, in that only one data block substitution is made from one permutation to the next. Of course, many other algorithms can be used to create and search the permutation list very effectively as well. The present description proceeds with respect to a gray coded type of list search for the sake of simplicity.

Once the permutation list is created, component 210 sets a current message combination to the first permutation in the list. This is indicated by block 274. Component 210 then creates the current message combination by substituting a block of data from the second instance 266 into the first instance 264 and computes a checksum on the combined message. This is indicated by block 276. In the example illustrated in FIG. 10B, component 210 replaces the first data block in the first instance 264 with the first data block in the second instance 266. Of course, the first instance 264 still contains an error in the fourth data block. Thus, component 210 computes the checksum to see if it is correct, which it is not. This is indicated by block 278.

Since the checksum is still not correct, component 210 determines whether all combinations in the permutation list have been tested. This is indicated by block 280. If they have, component 210 simply returns the first instance 264 as the true message and sets appropriate error flags, as indicated by block 268. However, if all permutations have not been tested, component 210 sets the current message combination to the next permutation in the permutation list. This is indicated by block 282 in FIG. 9. Component 210 then creates the next permutation by substituting another data block into instance 264 from instance 266, and computes the checksum. This is again indicated by block 276 and is illustrated in FIG. 10C.

Figure 10A:
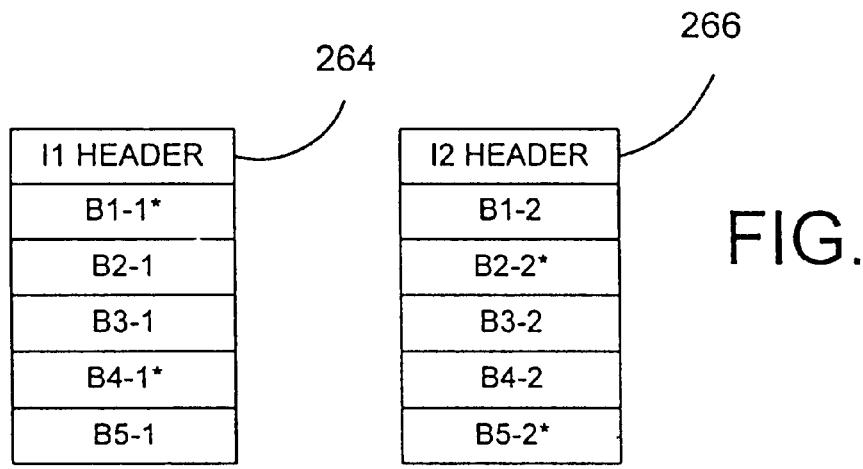
FIGS. 10A–10G are representations of instances of messages which are merged in accordance with the flow diagram illustrated in FIG. 9.
Figure 10B:
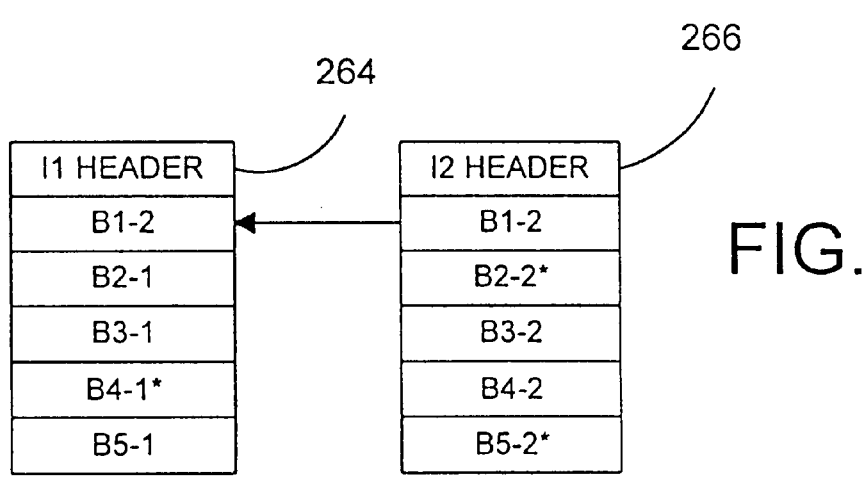
Figure 10C:
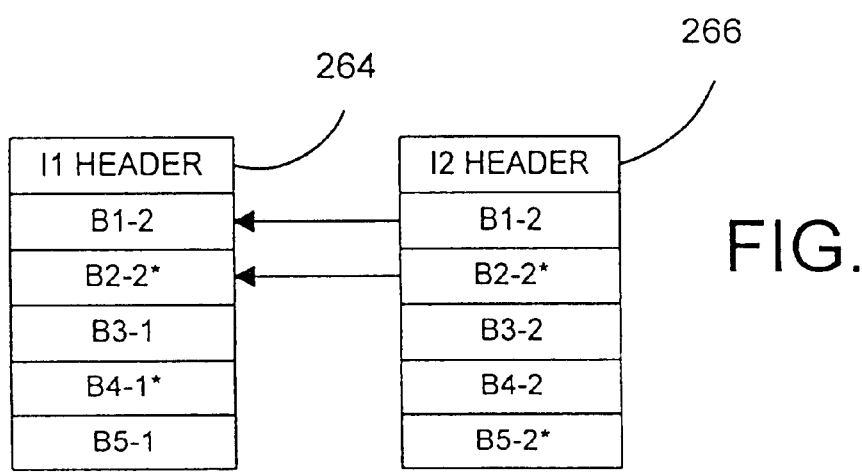
Figure 10D:
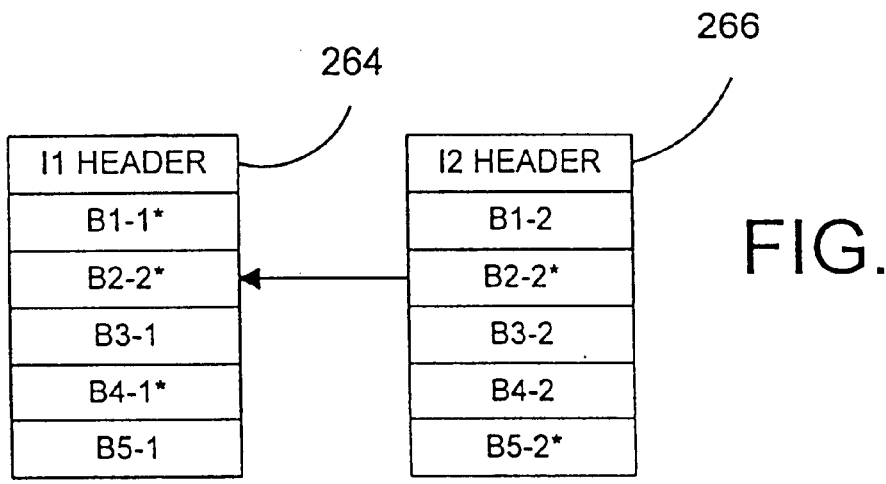

FIG. 10C shows that the combined message now includes the first and second data blocks from the second instance 266, substituted into the first instance 264. FIG. 10C also illustrates that the second and fourth data blocks are still in error, so the checksum will not be correct.

This process continues in a gray coded fashion as illustrated in FIGS. 10B–10G until an error free reconstructed message is found or until all permutations have been tested. For example, in FIG. 10D, component 210 places the first data block from the first instance 264 back in the combined message so that only the second data block is substituted from the second instance 266. The combined message now contains three erroneous data blocks and the checksum will not be correct.

Figure 10E:
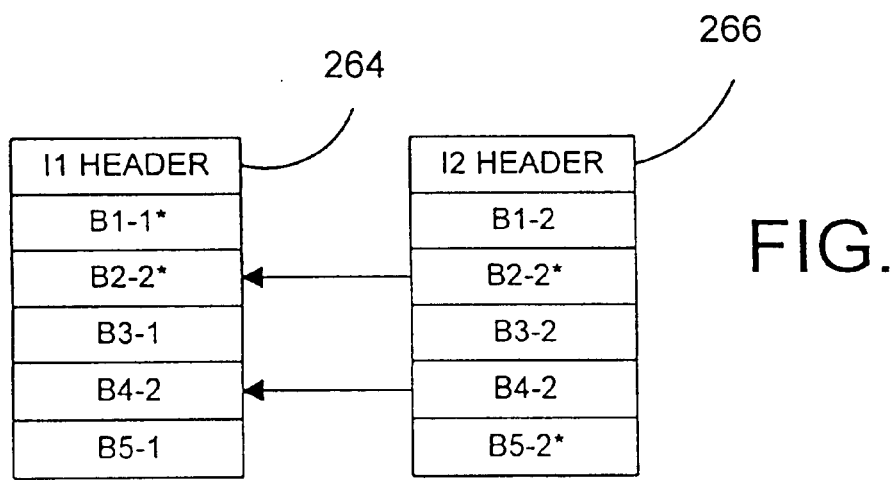

In FIG. 10E, the combined message contains the first, third and fifth data blocks from the first instance 264, but it has the second and fourth data blocks substituted from the second instance 266. The combined message is still not correct.

Figure 10F:
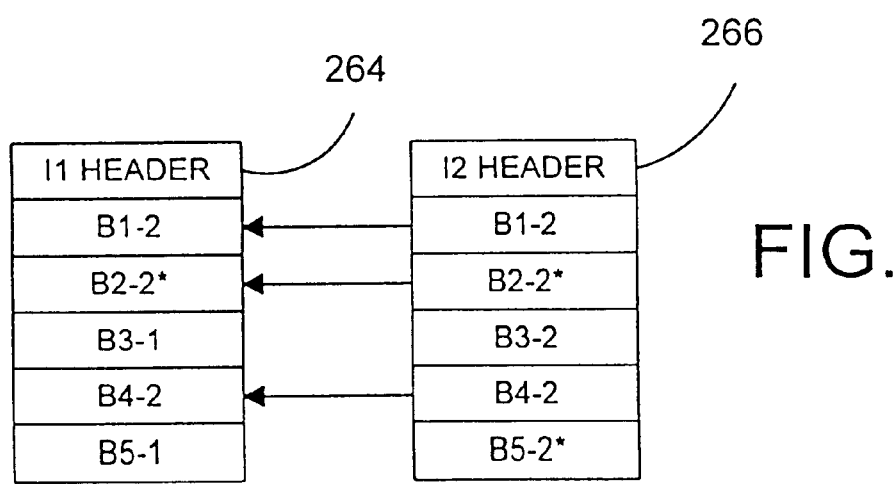

In FIG. 10F, the combined message includes only the third and fifth data blocks from the first instance 264 and contains the first, second and fourth data blocks from the second instance 266. The combined message is still not correct.

Figure 10G:
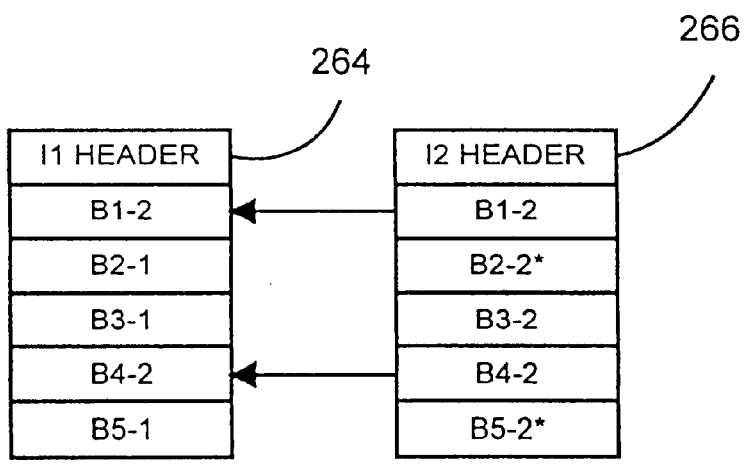

In FIG. 10G, the combined message contains the second, third and fifth data blocks from the first instance 264 and the first and fourth data blocks from the second instance 266. Thus, at block 278 in FIG. 9, the combined message is correct, and component 210 determines that the checksum is correct. Component 210 then returns the combined message as the true message, as illustrated in block 284 in FIG. 9.

Figure 11:
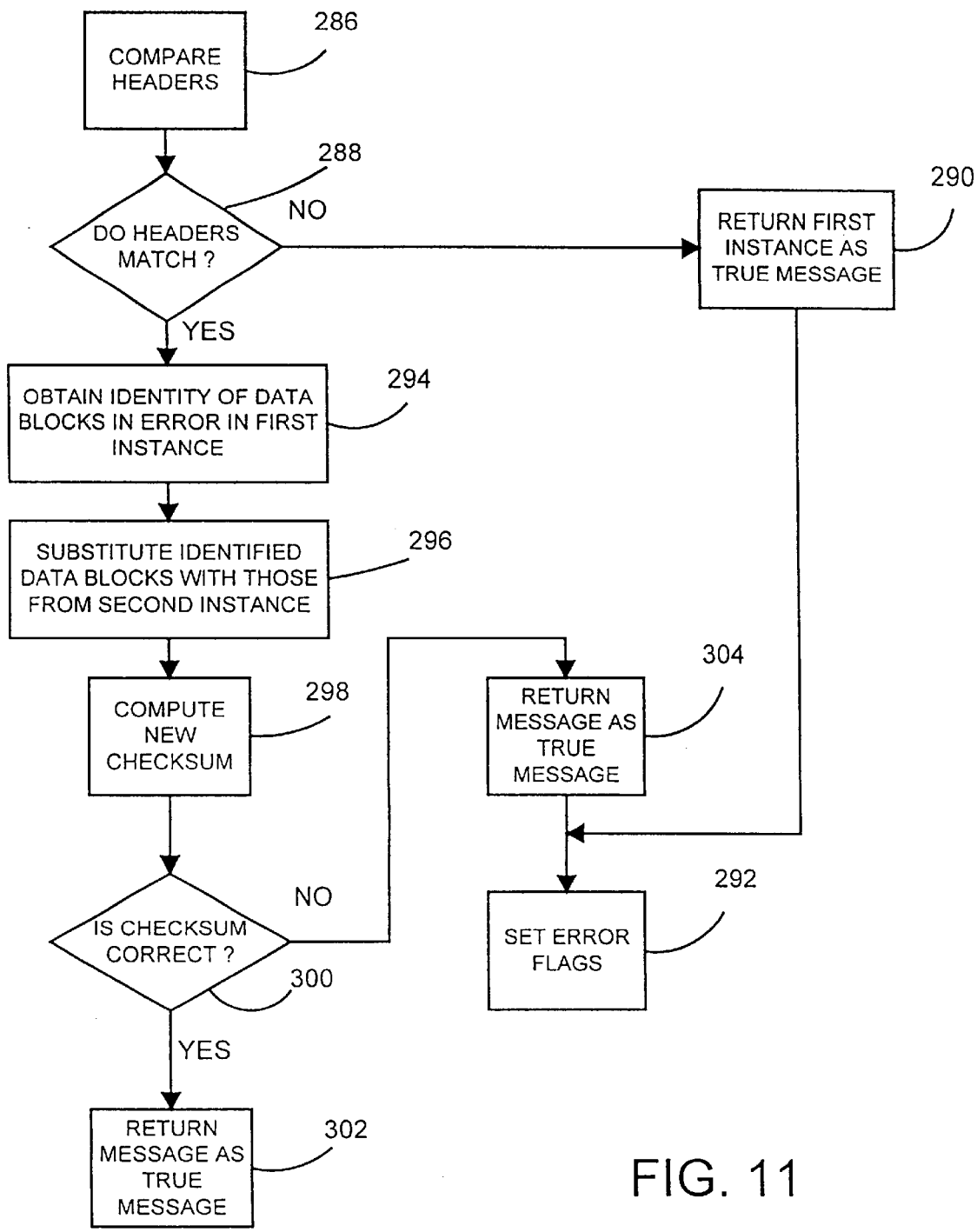
FIG. 11 is a flow diagram illustrating the operation of a mobile device in merging instances in accordance with another embodiment of the present invention.

FIG. 11 is a flow diagram illustrating one embodiment of the operation of component 210 utilizing a FLEX-type paging protocol. Recall that in such a protocol, error detection information 266 (FIG. 7) not only indicates that an error is present, but also identifies the particular data blocks in error. In that instance, component 210 compares the message headers to ensure that the sequence numbers match. This is indicated in blocks 286 and 288 in FIG. 11. If they do not match, component 210 simply returns the first instance of the message as the true message, and sets appropriate error flags. This is indicated by blocks 290 and 292.

However, if the sequence numbers do match; component 210 determines that it has received two instances of the same message. Component 210 then obtains the identity of the data blocks in error in the first instance, which it has computed by implementing the FLEX-type error detection algorithm. It should be noted that many error detection algorithms are known which can identify the location of data blocks which are in error in a data stream. Thus, any suitable detection mechanism can be used, so long as the appropriate error detection information is included in the protocol data structure provided to component 210. Obtaining the identity of the data blocks in errors is indicated by block 294 in FIG. 11.

Component 210 can also optionally obtain the identity of data blocks in error in the second instance. If some of them are the same as those in error in the first instance, then a complete error free message cannot be returned. In that instance, component 210 simply corrects those portions of the message which can be corrected by reconstructing a message with as many error free data blocks as possible and returns the partially corrected message as the true message and again sets error flags.

However, assuming that the same data blocks which are in error in the first instance are not in error in the second instance, component 210 substitutes the error free data blocks from the second instance for the erroneous data blocks in the first instance, as indicated by block 296 in FIG. 11.

Component 210 can then simply return the corrected message as the true message, or it can optionally (as an added error checking precaution) compute a checksum based on the corrected message, as illustrated by block 298. If the checksum is correct, as determined at block 300, component 210 returns the corrected message as the true message. This is indicated by block 302. However, if the checksum is not correct at block 300, component 210 simply returns the first instance as the true message and sets error flags as indicated by blocks 304 and 292 in FIG. 11.

Thus, it can be seen that the present invention can provide a number of significant advantages over prior systems. For example, the system is useful for data page applications, since there is no way that the user can be relied on to correct such messages. Similarly, the present invention provides a system which is not as inconvenient or cumbersome as prior methods. Further, from an end user's perspective, the system appears more reliable, because the number of messages which contain errors, and which are presented to the user, is reduced.

Although the present invention has been described with reference to preferred embodiments, workers skilled in the art will recognize that changes may be made in form and detail without departing from the spirit and scope of the invention.

What is claimed is:

1. A data structure forming a message for receipt by a mobile device over a paging channel, the data structure comprising:

a message body portion containing message information;

a redundancy portion containing redundancy information for use in performing error checking;

a sequence number portion containing a sequence number associated with the message; and a tag portion containing tag information indicative of whether multiple instances of the message are sent.

2. The data structure of claim 1 wherein the redundancy portion comprises a checksum having a value in a range of 0x20 to 0x7e hex.

3. The data structure of claim 2 wherein the redundancy portion is seven bits in length.

4. The data structure of claim 1 wherein sequence number has a value in a range of 0x20 to 0x7e hex.

5. The data structure of claim 1 wherein the sequence number is identical to a sequence number of another instance of the same message.

6. The data structure of claim 1 wherein the tag is two bits in length.

7. A method of receiving a message over a wireless connection, comprising:

receiving first and second instances of a message;

determining whether one of the first and second instances contain an error;

if so, determining whether another of the first and second instances contain an error; and when both the first and second instances contain an error, reconstructing the message by merging portions of only the first and second instances to obtain a reconstructed instance.

8. A method of processing a message received over a wireless connection, comprising:

receiving first and second instances of a message;

determining whether the first instance contains an error;

if the first instance is not found to contain an error, then representing the first instance without reference to the second instance;

if the first instance is found to contain an error, then determining whether the second instance also contains an error; and if the second instance is also found to contain an error, then merging error-free portions of the first and second instances to reconstruct an error-free instance of the message.

9. A data structure forming a message for receipt by a mobile device over a paging channel, said data structure comprising:

a message body portion containing message information;

a redundancy portion containing redundancy information for use in performing error checking, said redundancy portion comprising a checksum having a value in the range of 0x20 to 0x7e hex;

a sequence number portion containing a sequence number associated with the message; and a tag portion containing tag information indicative of whether multiple instances of the message are sent.

* * * * *

UNITED STATES PATENT AND TRADEMARK OFFICE
CERTIFICATE OF CORRECTION

PATENT NO. : 6,611,937 B1
DATED : August 26, 2003
INVENTOR(S) : Kadyk et al.

It is certified that error appears in the above-identified patent and that said Letters Patent is hereby corrected as shown below:

Title page,
Item [56], References Cited, U.S. PATENT DOCUMENTS, insert:
-- 6,209,111    3/2001   Kadyk et al.     714/717
   6,201,974    3/2001   Lietsalmi et al.   455/466 --

Column 5,
Line 6, "discdrive" should be -- disc drive --

Column 7,
Line 59, "enterprisewide" should be -- enterprise -wide --

Column 9,
Line 56, delete "." after "the"

Column 11,
Line 14, "216" should be -- 210 --

Signed and Sealed this

Seventeenth Day of August, 2004

JON W. DUDAS
*Acting Director of the United States Patent and Trademark Office*